May 31, 1932.  I. H. HALL  1,860,358
LIQUID EGG GRADING MACHINE
Filed April 26, 1929
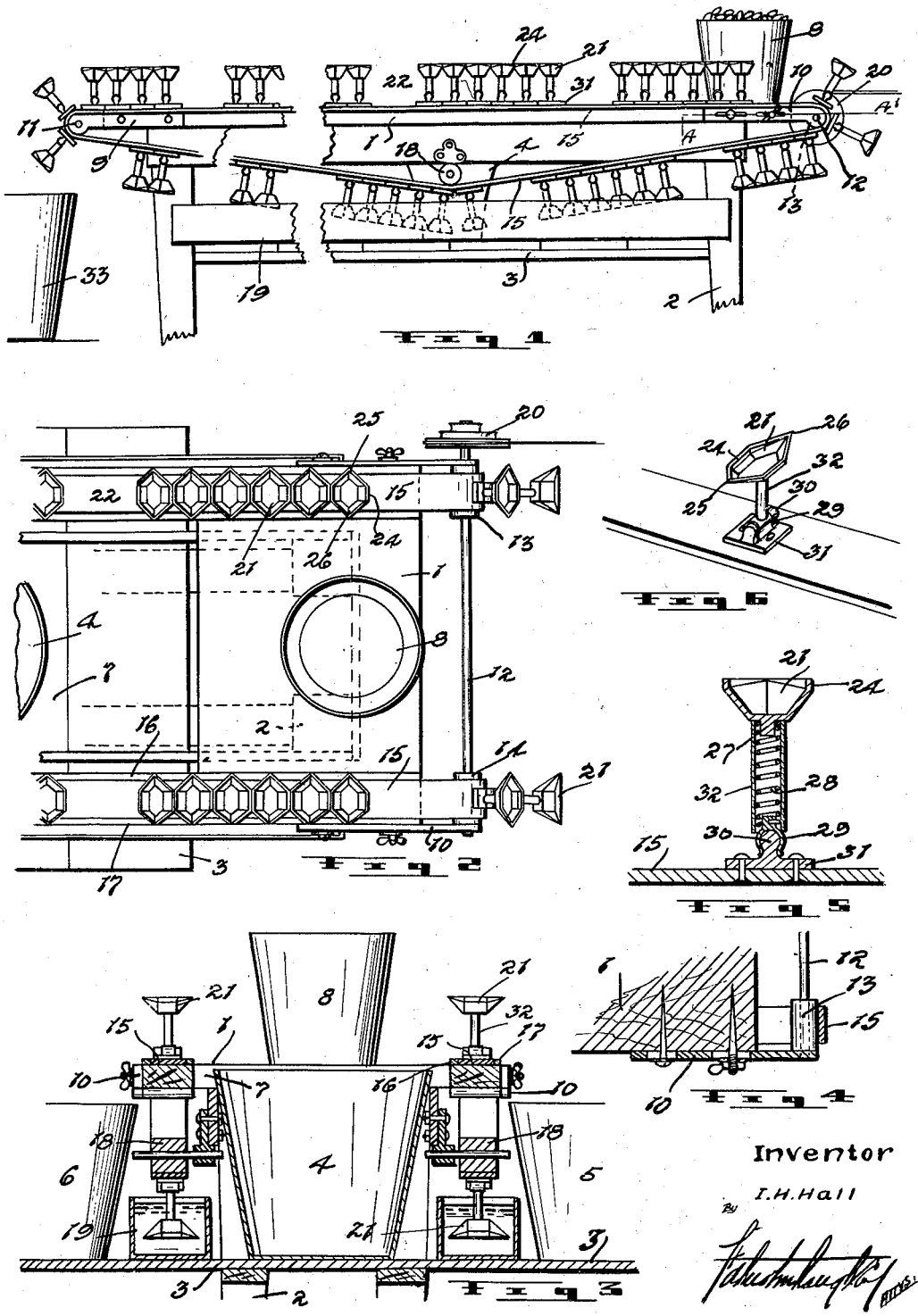
Inventor
I. H. Hall Patented May 31, 1932

1,860,358

UNITED STATES PATENT OFFICE

IPHUS H. HALL, OF WINNIPEG, MANITOBA, CANADA

LIQUID EGG GRADING MACHINE

Application filed April 26, 1929. Serial No. 358,409.

The invention relates to improvements in liquid egg grading machines and an object of the invention is to provide a machine which will permit a minimum number of operators to effectively grade a relatively large number of eggs, the machine construction being such that there is a continual stream of egg receiving cups passing the operators which necessitates fast work in order to keep up with the flow.

A further object of the invention is to provide an egg grading machine embodying an endless conveyor carrying liquid egg receiving cups and wherein the cups are attached to the conveyor so that they can be laterally deflected in either direction as desired by the tester.

A still further object of the invention is to support the cups so that when released, they will return to their normal receiving position and such that there will be no space between any group of cups permitting of the spilling of the egg between cups.

A further object of the invention is to attach the cups to the conveyor so that they can be easily and quickly removed should a bad egg be encountered.

A still further object of the invention is to provide means for sterilizing the moving cups after they have deposited the egg and before a new egg is placed therein.

With the above more important objects in view, the invention consists essentially in the arrangement and construction of parts hereinafter more particularly described, reference being had to the accompanying drawings, in which:—

Fig. 1 is a side view of a machine constructed in accordance with my invention.

Fig. 2 is a plan view of one end of the machine.

Fig. 3 is an enlarged detailed vertical cross sectional view at 3—3' Figure 1.

Fig. 4 is an enlarged detailed horizontal sectional view at 4—4' Figure 1.

Fig. 5 is an enlarged detailed vertical sectional view centrally through one of the cups and parts associated therewith.

Fig. 6 is a perspective view of one of the cups.

In the drawings like characters of reference indicate correspondng parts in the several figures.

The machine herein shown is equipped with two cup-carrying endless conveyors which are simply used in order to speed up the grading operation.

In carrying out my invention, I provide a table 1 suitably supported by corner legs 2 and provided with a shelf 3 which is utilized to support a central receptacle or pail 4 and two side receptacles or pails 5 and 6. The table is provided with a central opening 7 through which eggs can be discharged from either conveyor into the pail 4 and the front end of the table supports a further receptacle or pail 8 for eggs in their shells.

The ends of the table carry pairs of bearings 9 and 10, those 9 being stationary and those 10 adjustable and the bearings support rotatably cross shafts 11 and 12 on each of which I mount rollers 13 and 14. The sides of the table extend beyond the legs and at each side thereof, I locate an endless conveyor 15 which is carried by the rollers of the shafts. The top side of each belt drags over the top face of the table and is received between guide strips 16 and 17 fastened to the table.

The under side of the belt extends under an idler roller 18 suitably suspended from the table and acting to hold the under side of the belt with the central portion thereof depressed as shown best in Figure 1. The said depressed parts of the belts are adapted to enter similar sterilizing tanks 19 suitably supported by the shelf. The shaft 12 is driven by a cone pulley 20, this allowing of varying speeds as selected. Each belt carries a plurality of egg receiving cups 21, the cups being preferably arranged in groups and having the groups spaced apart as indicated at 22.

The cups are all similarly constructed and attached to the belt so that the description of one will suffice. The cup 21 is of a size such that it will receive both the yoke and the white of an egg and it has the sides thereof flattened as indicated at 24 and the ends thereof tapering to a point as indicated at 25 and 26 to facilitate pouring. The bottom of the cup is supplied with an extending stud 27 which is received within the upper end of a coiled spring 28, sufficient friction being developed to hold the spring tightly on the stud. The lower end of the spring carries a spring clip 29 which is adapted to engage a bulbous head 30, the flat base 31 of which is secured to the conveyor or belt.

The springs obviously support the cups side by side in an elevated horizontal position but permit of the lateral deflection of any selected cup in order to pour the contents thereof at one side or other of the conveyor. A flexible tubing 32 such as of rubber encloses the spring to keep the same clean. By attaching the cups to the belt in this way, it is possible to readily remove a cup when desired, the spring clip releasing from the head under a pulling pressure. At the end of the belt remote from the pail 8, I locate a receptacle 33 into which the eggs permitted to pass the full length of the conveyor are discharged.

The machine as shown will require four operators, two egg breakers adjoining the pail 8 and two inspectors to the inner side of the breakers. The breaker, in each instance, will break the eggs after taking them from the pail 8 and will deposit the yolk and white into a cup. As the cups are passing the breaker relatively quickly, she will have to work fast in order to fill each passing cup with a liquid egg.

The tester smells each egg containing cup as it passes her and if a bad egg is encountered removes the cup from the belt. The eggs which she grades number 1 are permitted to pass and become discharged in the pail 33. If the egg is graded by the inspector as number two grade, she will press the cup containing that egg away from her and cause the egg to be discharged into the pail 4. Should she grade another cup as number three grade, the cup containing it will be shifted in the opposite direction and the egg contained therein will be discharged into the pail 5 or 6 depending at which side of the table she is working. Obviously the inspector has to work fast as the eggs are passing in a continuous stream.

I have provided spaces between the groups of cups so that the inspector can quickly determine the location of any egg tested by positioning it in respect to the space. This makes it possible for her attention to be detracted momentarily and not lose track of the egg last tested. The cups in a group have their flat sides rubbing so that there is no crack exposed through which an egg might spill and such together with the pointed ends of the cups insure that the cups will be always properly positioned when they return after deflection.

Whilst I have given a detailed description of the spring support and the detachable connection to the belt, it will be readily understood that any support which can be laterally deflected by pressure and will upon the release of the pressure return to its normal position, will serve my purpose as will also any simple and reliable arrangement for detachably fastening the cups.

What I claim as my invention is:—

1. In an egg grading machine, an endless driven horizontally disposed conveyor, a plurality of individual liquid egg receiving cups carried by the conveyor and positioned side by side thereon and mounted to permit of the discharging to either side of the conveyor of the contents of any selected cup.

2. In an egg grading machine, an endless driven horizontally disposed conveyor, a plurality of individual liquid egg receiving cups carried by the conveyor and positioned side by side thereon and mounted to permit of the discharging to either side of the conveyor of the contents of any selected cup, said cup automatically returning to its original position after having been upset.

3. In an egg grading machine, an endless driven horizontally disposed conveyor, a plurality of upstanding flexible shanks mounted on the conveyor and an individual liquid egg receiving cup carried by each shank.

4. In an egg grading machine, an endless driven horizontally disposed conveyor, a plurality of upstanding coiled springs attached to the conveyor and positioned side by side throughout the length thereof and similar individual liquid egg receiving cups mounted on the upper ends of the springs.

5. In an egg grading machine, an endless driven horizontally disposed conveyor, a plurality of upstanding coiled springs attached to the conveyor in groups, individual liquid egg receiving cups secured to the upper ends of the springs, the cups in each group being positioned side by side.

6. In an egg grading machine, the combination with a driven conveyor, of a normally upstanding resilient shank attached to the conveyor and an egg receiving cup carried by the upper end of the shank.

7. In an egg grading machine, the combination with a driven conveyor, of a normally upstanding resilient shank detachably fastened to the conveyor and an individual liquid egg receiving cup carried by the upper end of the shank.

8. In an egg grading machine, the combination with a driven conveyor, of a normally upstanding coiled spring having the lower end fastened to the conveyor and an individual liquid egg receiving cup carried by the upper end of the spring.

9. In an egg grading machine, the combination with a driven conveyor, of a normally upstanding coiled spring having the lower end fastened to the conveyor, an individual liquid egg receiving cup carried by the upper end of the spring and a flexible tubing surrounding the spring.

Signed at Winnipeg, this 2nd day of February, 1929.

IPHUS H. HALL.